United States Patent [19]
Olander

[11] 3,965,069
[45] June 22, 1976

[54] POLYPHENYLENE OXIDE IS PREPARED USING A MIXTURE OF MANGANESE CHELATES AS A CATALYST

[75] Inventor: Walter K. Olander, Elnora, N.Y.

[73] Assignee: General Electric Company, Schenectady, N.Y.

[22] Filed: Dec. 20, 1974

[21] Appl. No.: 534,903

[52] U.S. Cl. .......................................... 260/47 ET
[51] Int. Cl.² ........................................ C08G 61/10
[58] Field of Search .......................... 260/47 ET

[56] References Cited
UNITED STATES PATENTS

| | | | |
|---|---|---|---|
| 3,444,133 | 5/1969 | Behr et al. | 260/47 ET |
| 3,784,575 | 1/1974 | Rutledge | 260/47 ET X |
| 3,793,246 | 2/1974 | Izawa et al. | 260/47 ET |
| 3,825,521 | 7/1974 | Izawa et al. | 260/47 ET |

FOREIGN PATENTS OR APPLICATIONS

| | | | |
|---|---|---|---|
| 47-44360 | 1972 | Japan | 260/47 ET |

OTHER PUBLICATIONS

Shono et al., Die Makromolekulare Chemie, 105 (1967) pp. 277–279.

*Primary Examiner*—Lucille M. Phynes
*Attorney, Agent, or Firm*—F. Wesley Turner; Joseph T. Cohen; Jerome C. Squillaro

[57] ABSTRACT

A process for the preparation of polyphenylene oxide employing a mixture comprising a manganese(II) oxime chelate Type (A) and a manganese chelate Type (B) as a catalyst is described. The catalyzed process can be effectively carried out in the presence as well as the absence of an amine. The process is economical and useful in the production of polyphenylene oxide resins.

20 Claims, No Drawings

POLYPHENYLENE OXIDE IS PREPARED USING A MIXTURE OF MANGANESE CHELATES AS A CATALYST

This invention relates to a process of forming self-condensation products of a phenol under polymer forming reaction conditions to a polyphenylene oxide in the presence of a mixture of Type (A) and Type (B) manganese chelate complexes of the formulas:

Type (A): $(L^1)_x Mn$, wherein $L^1$ is a ligand derived from an ortho-hydroxyareneoxime, an ω-hydroxyoxime or a mixture thereof, Mn is the transition metal manganese(II), and $x$ is a positive number at least equal to about 0.5, and Type (B): $(L^2)_x Mn$, wherein $L^2$ is a ligand other than an $L^1$ ligand, Mn is the transition metal manganese and $x$ is a positive number at least equal to about 0.5.

The Type (A) ligand forming molecule ($L^1$) can be described by the following ortho-hydroxyareneoxime and ω-hydroxyoxime, respectively, formulas:

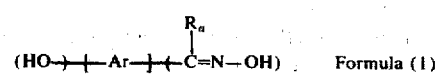

Formula (1)

wherein $R_a$ is independently selected from the group consisting of hydrogen and lower alkyl radicals having from 1–5 carbon atoms, Ar is at least a divalent arene radical having at least one -OH radical and at least one

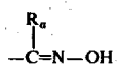

radical attached directly to ortho-positioned arene ring carbon atoms, and

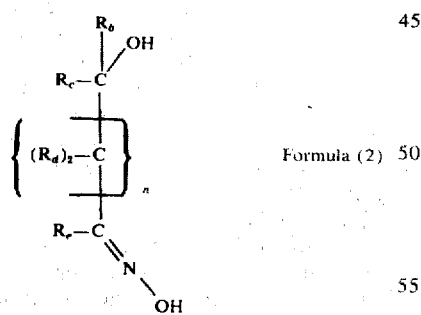

Formula (2)

wherein each $R_b$, $R_c$, $R_d$ and $R_e$ is independently selected from the group consisting of hydrogen, acyclic and cyclic organic radicals, and $n$ is a positive integer equal to 0 or 1.

The Type (B) ligand forming molecule ($L^2$) can be any other suitable ligand forming molecule.

In general, the prior art has determined that first series transition metals such as copper, cobalt, manganese, etc., can be beneficially employed under certain reaction conditions to promote the oxidative coupling of phenols to form polyphenylene oxides (also commonly referred to as polyphenylene ethers). Representative of prior art teachings describing the use of such catalyst systems are U.S. patents, Hay 3,306,874 and 3,306,875; Bussink 3,337,501; Behr 3,444,133; Kobayashi 3,455,880; Nakashio 3,573,257; Nishioka 3,787,358; Izawa 3,793,246; and Belgium patent Kanegafuchi 776,044.

Unexpectedly, it has been found that a highly efficient polyphenylene oxide process is provided wherein a mixture comprising a Type (A) and a Type (B) manganese chelate is used to catalyse the rate of polyphenylene oxide formation during the self-condensation of phenols. That the mixed manganese chelate catalyst system's effect is unexpected is supported by the following findings:

(a) in the preparation of polyphenylene oxide in an otherwise similar process, Type (B) manganese chelate species either are ineffective in catalyzing the formation of polyphenylene oxide or are effective only in catalyzing the formation of low molecular weight polyphenylene oxide, whereas (b) when a Type (B) manganese chelate species is employed in combination with a Type (A) manganese(II) chelate, a catalytic mixture results which effectively catalyses the formation of high molecular weight polyphenylene oxide at reaction rates greater than the rates associated with polyphenylene oxide formation wherein only Type (A) manganese(II) chelates are employed as the catalytic agent.

In essence, my invention comprises the oxidative coupling of a phenol under polymer-forming reaction conditions to produce a polyphenylene oxide wherein the process is carried out in the presence of a mixture of Type (A) and Type (B) manganese chelate complexes of the formulas:

Type (A): $(L^1)_x Mn$, wherein $L^1$ is a ligand derived from an ortho-hydroxyareneoxime, an ω-hydroxyoxime or a mixture thereof, Mn is the transition metal manganese(II), and $x$ is a positive number at least equal to about 0.5, and Type (B): $(L^2)_x Mn$, wherein $L^2$ is a ligand other than an $L^1$ ligand, Mn is the transition metal manganese, and $x$ is a positive number at least equal to about 0.5.

Subject to the proviso that the suitability of any Type (A) and Type (B) manganese chelate in the practice of this invention is not to be limited by any theory, it is believed that a number of reaction mechanisms may be involved in the catalytic effects associated with the combination of Type (A) and Type (B) manganese chelates. Among the many possible reaction mechanisms which are set out herein as possible partial explanations for the effects associated with the combination of Type (A) and Type (B) manganese chelates are the following:

1. The reactive or effective catalyst entity which results from the mixture of Type (A) and Type (B) chelates may be unsymmetrical, dimeric in composition and connected at some time by bridging oxygen molecule, e.g. as represented by the following structure:

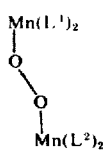

wherein L¹ and L² are defined as set out hereinbefore.

2. The mixture of Type (A) and Type (B) chelates may result in the formation of a more reactive catalyst species by ligand exchange, e.g. as represented by the following equation:

The above mechanism is feasible when bidentate ligands are associated with Type (A) and Type (B) manganese chelates, however, is not feasible when multidentate, e.g. tetradentate, ligands are associated with either Type (A) and/or Type (B) manganese chelates.

3. The full catalytic effects or cycle in the oxidative coupling of a phenol may be assumed to be a complex series of steps involving various reaction mechanisms. In such steps, the mechanism which is the slowest reaction sequence or step will be rate limiting for the over-all reaction. It is possible that when a mixture of Type (A) and Type (B) chelates are employed in the preparation of polyphenylene oxide that a specialized interaction occurs wherein each Type (A) and Type (B) chelate component separately performs more successfully one or more of the mechanism steps comprising the full catalyst cycle which specialized interaction occurs more rapidly, i.e. in a shorter period of time, than any action which occurs in the presence of a Type (A) or Type (B) chelate, solely. Thus, although mixtures may make the mechanism more complex, the actual rate of formation of polyphenylene oxide is increased. A key aspect of this theoretical concept may reside in the oxidation-reduction cycle and in electron transport carried out by an effective catalyst species derived from the mixture.

Any or all of the above theoretical concepts may be related to my unexpected finding that (1) the Type (A) and Type (B) chelate components in combination effect the rate at which the intrinsic viscosity of the polyphenylene oxide increases with respect to reaction time, (2) the combination of Type (A) and Type (B) chelate components provide a convenient means of establishing a catalyst mixture which is self-limiting (limits the intrinsic viscosity of the polyphenylene oxide) irrespective of the length of the reaction time period, and (3) by varying the proportions of Type (A) and Type (B) chelate components provides a convenient and unexpected means by which the rate of change of the intrinsic viscosity of polyphenylene oxide with respect to reaction time can be varied.

The Type (A) ligand forming molecule (L¹) can be described by the following ortho-hydroxyareneoxime and ω-hydroxyoxime, respectively, general formulas:

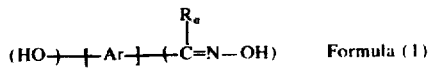
Formula (1)

wherein $R_a$ is independently selected from the group consisting of hydrogen and lower alkyl radicals having from 1–5 carbon atoms, Ar is at least a divalent arene radical having at least one -OH radical and at least one

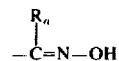

radical attached directly to ortho-positioned arene ring carbon atoms, and

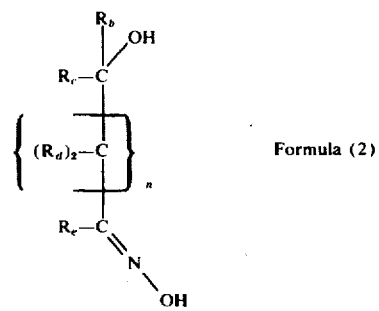
Formula (2)

wherein each $R_b$, $R_c$, $R_d$ and $R_e$ is independently selected from the group consisting of hydrogen, acyclic and cyclic organic radicals, and $n$ is a positive integer equal to 0 or 1.

The Type (B) ligand forming molecule (L²) can be any other suitable ligand forming molecule.

Any Type (A) manganese(II) chelate can be employed, and can be any form, e.g. a mono, bis, tris, tetrakis, etc., ligand form wherein one, two, three or four etc. bidentate ligands are associated with a single manganese(II) atom.

In general, a Type (A) manganese chelate is defined herein and in the appended claims as any manganese(II) chelate which, under controlled polyphenylene oxide polymer reaction conditions, requires a polymerization reaction time period of less than 120 minutes in order to form a polyphenylene oxide having an intrinsic viscosity greater than 0.3 dl/g. at 25° C. in chloroform. Controlled reaction conditions are defined herein as 2,6-xylenol polymerization carried out under atmospheric pressure and at a constant temperature of 25° C. employing toluene and methanol as the solvent system wherein the weight ratio of 2,6-xylenol:toluene:methanol is 10%, 81% and 9%, respectively (10% monomer solids), the proportions by weight of 2,6-xylenol to sodium hydroxide is 16.39:1, and the mole proportions of 2,6-xylenol to Type (A) manganese(II) chelate is 100:1.

The Type (A) bidentate ligand is defined herein and in the appended claims as s cyclic ring structure which arises from the union of a single manganese(II) atom with a single oxime nitrogen atom of a

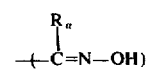

or a

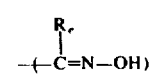

radical and a single hydroxy oxygen atom of an -OH radical associated with a single ortho-hydroxyareneoxime ligand forming molecule of Formula (1) or associated with a single ω-hydroxyoxime ligand forming molecule of Formula (2). Two comprehensive descriptions, hereby incorporated in their entirety herein by reference, of Type (A) manganese(II) chelates suited to the practice of this invention and methods of their preparation are set out in my copending U.S. patent applications Ser. Nos. 491,370 and 491,475, filed concurrently on July 24, 1974, which are assigned to the same assignee as the assignee of this invention. As described in my copending applications, Type (A) manganese(II) chelates can be prepared by any method known to those skilled in the art which introduces a divalent manganese ion, commonly referred to as Mn(II) or as $Mn^{++}$ to any appropriate ortho-hydroxyarene-alkoxime or ortho-hydroxyarene-ketoxine of Formula (1) or any appropriate hydroxyalkoxime or hydroxyketoxime of Formula (2). In general, any amount of a manganese(II) atom and a Formula (1) or Formula (2) ligand can be combined in the preparation of a Type (A) manganese(II) chelate. However, it is preferred that the proportion of Mn(II) and ligand be at least sufficient to form a Mn(II) monobidentate chelate, e.g. wherein $(L^1)_x Mn$, $x$ is a positive number at least equal to about 1, and more preferred be at least sufficient to form a Mn(II) bisbidentate chelate, e.g. wherein $(L^1)_x$, $x$ is a positive number at least equal to about 2.

Preferably, the Ar (arene radical) of the orthohydroxyareneoxime of FIG. (1) contains from about 6 to about 30, more preferably from about 6 to about 15, and even more preferably from about 6 to about 9 carbon atoms. Illustrative of individual arene radicals are the following: phenylene, methylphenylene, dimethylphenylene, ethylphenylene, propylphenylene, butylphenylene, pentylphenylene, decylphenylene, tetracosylphenylene, aminophenylene, hydroxyphenylene, methoxyphenylene, hexanotephenylene, dibutylaminophenylene, ethoxyphenylene, cyclohexylphenylene, phenylphenylene, chlorophenylene, methylnaphthalene, pentylnaphthalene, decylnaphthalene, pentadecylnaphthalene, eicosylnaphthalene, dimethylnaphthalene, methylamino-3-propyl naphthalene, etc. Illustrative of ortho-hydroxyareneoxime ligand forming molecules which contain a preferred arene radical as defined above that can be employed to prepare Mn(II) chelates follow:

Formula (3)

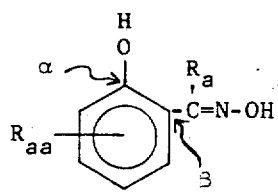

Formula (4)

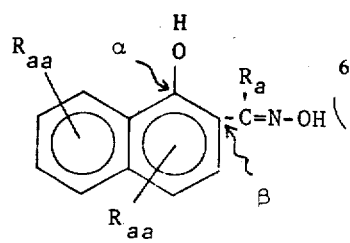

Formula (5)

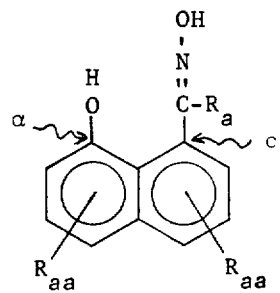

Formula (6)

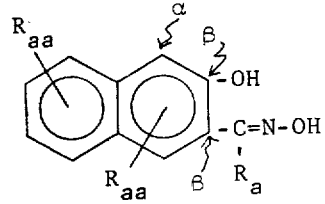

wherein $R_a$ is as defined hereinbefore and $R_{aa}$ is selected from the group consisting of hydrogen or alkyl, cycloalkyl, aryl, amino, monoalkylamino, dialkylamino, halide, hydroxy, alkoxy, alkanoate radicals and combinations thereof. As illustrated by Formulas (3) through (6), as used in Formula (1) both in the written description and in the appended claims with reference to Ar being at least a divalent radical having at least one -OH radical and at least one

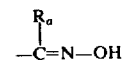

radical attached directly to ortho positioned arene ring carbon atoms, at least one combination of hydroxy and oxime radicals are attached directly to carbon atoms located at $\alpha$, $\alpha$, $\alpha$, $\beta$, or $\beta$, $\beta$ positions of cyclic and polycyclic aromatic compounds. The carbon chain or ring location of any other substituent, e.g. an $R_{aa}$ radical of Formulas (3) through (6), is not critical to the effectiveness of the Mn(II) orthohydroxyareneoxime chelates in the process of this invention.

Specific examples of Type (A) chelates having ligands of Formula (1) include the following: manganese(II) bis(salicylaldoxime), manganese(II) bis(2-hydroxy-5-chlorophenyl-aldoxime), manganese(II) bis(2-hydroxy-5-bromophenylaldoxime), manganese(II) bis(5-methylsalicylaldoxime), manganese(II) bis(2-hydroxy-5-methylacetophenoneoxime), etc., among others.

Preferably the ω-hydroxyoxime of Formula (2), $R_b$, $R_c$, $R_d$, and $R_e$ substituents -- other than hydrogen -- are any acyclic or cyclic organic radical, contain from about 1 to about 30, more preferably from about 1 to about 15, carbon atoms per substituent. Preferred ω-hydroxyoxime ligand forming molecules have at least one aliphatic or aromatic substituent attached to each of the $\alpha$ and $\omega$ chelate ring carbon atoms of the ω-hydroxyoxime compound. Even more preferably, at least one of the two substituents attached to the $\alpha$ and $\omega$ chelate ring carbon atoms is an aromatic substituent. Specific examples of Type (A) chelates having ligands of Formula (2) include the following: Mn(II) bis(benzoinoxime), Mn(II) bis(anisoinoxime), Mn(II) bis(paradimethylaminobenzoinoxime), Mn(II) bis(furoinoxime), Mn(II) bis(acetoinoxime), Mn(II) bis(methylhydroxybutanoneoxime), Mn(II) bis(α-hydroxyactophenoneoxime), Mn(II) bis(2-methyl-2-hydroxy- 4-pentanoneoxime), Mn(II) bis(phenylhydroxybutanoneoxime), etc., among others.

Any suitable Type (B) manganese chelate can be employed and can be in any form. In general, a Type (B) manganese chelate is defined herein and in the appended claims as any manganese chelate which, under controlled polyphenylene oxide polymer reaction conditions, requires a polymerization reaction time period of at least 120 minutes in order to form a polyphenylene oxide having an intrinsic viscosity equal to or less chan 0.30 dl/g. at 25° C. in chloroform. Controlled reaction conditions are defined herein as 2,6-xylenol polymerization carried out under atmospheric pressure and at a constant temperature of 25° C. employing toluene and methanol as the solvent system wherein the weight ratio of 2,6-xylenol: toluene:methanol is 10%, 81% and 9%, respectively (10% monomer solids), and the mole proportions of 2,6-xylenol to Type (B) manganese chelate is 100:1. In general, the Type (B) manganese chelate components of the catalyst system of this invention can vary widely with regard to (a) the manganese atom, (b) the chelating molecule, (c) the nature of the bond linking the manganese atom and the chelating molecule, and (d) the influence of each and all of (a), (b) and (c) upon the behavior of the metal chelate as a whole. Manganese, which belongs to the first transition series, has nine oxidation states varying from −1 to +7. However, preferably when employed in this invention, Mn is employed as a divalent manganese ion, commonly referred to as Mn(II) or Mn$^{++}$. The Type (B) manganese chelate can be employed as mono, bis, tris, tetrakis, etc., complexes wherein one, two, three, four, etc., bidentate or multidentate ligands are associated with a single manganese atom. Type (B) bidentate and multidentate ligands are defined herein and in the appended claims as the molecular structure which arises from the union of a manganese atom with at least two donor atoms and at least three or more donor atoms, respectively, of a ligand forming molecule. The Type (B) ligand molecules contain two or more functional groups having suitable donor atoms, i.e. atoms which are capable of combining with a manganese atom by donating a pair of electrons. The electrons are contributed by basic coordinating groups, some of which may be deprotonated. Representative of functional groups are the following: -OH (enolic and phenolic), -SH, =O, -NH$_2$, -NRH, =NH, -N=, -O-R, =NOH, -OH (alcoholic), -S- (thioether), R being selected from acyclic or cyclic organic compounds, preferably aliphatic hydrocarbons, more preferably primary alkyl radicals containing from 1 to 4 carbon atoms.

Many Type (B) ligand forming molecules contain three or more donor atoms capable of combining with metal atoms forming interlocking or fused chelate rings. Preferably, Type (B) chelates having two donor atoms associated with a ligand molecule are employed as a bis-complex wherein two cyclic ring structures are derived from the union of a single manganese(II) atom with two Type (B) ligand forming molecules. Representative of Type (B) manganese chelate ligand (L$^2$) molecules and the donor atoms associated therewith are set out hereafter: ethylene glycol (O,O), 1,3-propanediol (O,O), acetylacetone (O,O), salicyclaldehyde (O,O), o-dihydroxy benzene (O,O), dimethylglyoxime (N,N), diphenylglyoxime (N,N), 2-pyridinealdoxime (N,N), 3-pyridinealdoxime (N,N), 2-(2-pyridyl)-benzimidazole (N,N), 2-aminoethanol (N,O), 3-amino-1-propanol (N,O), 2-oximo-3-butanone (N,O), N-(2-hydroxyethylidene)methylamine (N,O), benzil mono-oxime (N,O), α-aminobutyrate (N,O), o-aminophenol (N,O), 8-hydroxyquinoline (N,O), toluene-3,4-dithiol (S,S), o-benzenedithiol (S,S), 4-chlorobenzene-1,2-dithiol (S,S), 2-mercaptoethylamine (S,N), methyl-α-amino-β-mercaptopropionate (S,N), thiosemicarbazide (S,N), 8-(α-pyridylmethyleneamino)-quinoline (N,N,N), pyridine-2-aldazine (N,N,N), α, β, γ-triaminopropane (N,N,N), salicylideneamino-o-hydroxybenzene (N,O,O), 1,2-bis(6'-methyl-2'-pyridylmethyleneamino)ethane (N,N,N,N), 1,6-bis(α-pyridyl)-2,4-diazahexane (N,N,N,N), 1,2-bis(8'-quinolylmethyleneamino)ethane (N,N,N,N), 2,2'-bis(-salicylideneamino)-6,6'-dimethyldiphenyl (N,O,N,O), bis(salicylaldehyde)ethylenediimine (O,N,N,O), bis(salicylaldehyde)-1,2-propylenediimine (O,N,N,O), bis(salicylaldehyde)1,3-propylenediimine (O,N,N,O), etc., 1,8-bis(α-pyridyl)-3,6-dithiaoctane (N,S,N,S), 1,8-bis(-salicylideneamino)-3,6-dithiaoctane (O,N,S,S,N,O), N,N'-ethylene-bis-2-(o-hydroxyphenyl)glycine (O,N,O,O,N,O).

The above examples of Type (B) chelate ligand molecules are merely illustrative of the unlimited number of Type (B) ligand substituents which may be employed in accordance with the concepts set-out-herein in the practice of this invention.

The Type (B) chelates can be prepared by any of the methods known to those skilled in the art, such as those described by Dwyer and Mellor in "Chelating Agents and Metal Chelates" published by Academic Press, New York and London (1964) Library of Congress Catalog Card Number: 63–16969, including methods referenced therein.

In the preparation of the Type (B) chelates, the manganese ion associated with Type (B) ligand forming molecules can be derived from any manganese compound which is at least partially dispersible or soluble in a solution containing a Type (B) ligand forming molecule. Representative of preferred manganese compounds, preferred since manganese(II) Type (B) chelates are preferred in the practice of this invention, include such manganese compounds as manganese(II) halides, e.g. manganese(II) chloride (also known as manganous chloride), manganese(II) bromide, manganese(II) iodide, etc., as well as other manganese(II) compounds, e.g. manganese(II) carbonate, manganese(II) sulfate, manganese(II) acetate, manganese(II) nitrate, manganese(II) phosphates, etc., including hydrated forms of such Mn(II) compounds.

A currently preferred method of preparing Type (A) manganese(II) chelates (which is described in greater detail in the aforementioned copending applications) and Type (B) manganese(II) chelates comprises the formation of a solution of a manganese(II) compound mixture of Type (A) and Type (B) ligand forming molecules in a suitable mixed solvent system comprising (a) methanol, and (b) an aromatic compound, e.g. chlorobenzene, toluene, and xylene, etc., or combinations thereof. Although not critical to the formation of an effective mixed Type (A) and (B) manganese chelate reaction catalyst, it is presently preferred after formation of the manganese chelate in a solution that an inorganic base be added to the solution in an amount at least sufficient to maintain a weakly basic manganese chelate solution. It is believed, although not wishing to limit this invention by any theory, that the addition of an inorganic base, such as an alkali metal hydroxide or alkoxide to the manganese chelate solution especially those containing a Type (A) chelate component, facilitates the possible formation of O ... H—O bridges via hydrogen bonding of a Type (A) catalyst component. Dissociation of Type (A) bridging protons, it is further postulated -- at some point in the polymerization of a phenol to a polyphenylene oxide -- maybe an important link in the effectiveness of Type (A), especially Type (A) manganese(II) chelates, when employed in the process of this invention. As represented by the disclosures of the copending application, referenced hereinbefore, it appears that the oxygen of the oxime group,

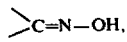

associated with the Type (A) ligand forming molecule influences not only the properties of the associated oxime nitrogen atoms, but also influences hydrogen bonding O...H with a bridged hydrogen atom derived from a hydroxyl group of another Type (A) ligand forming molecule.

The possibility of formation of multiple rings, i.e. five- or six-membered Type (A) chelate rings closely associated with hydrogen bonding, is believed - especially with the five-membered chelate rings - to markedly increase the stability and effectiveness, especially of Type (A) Mn(II) chelate and Type (B) manganese chelate mixtures, in promoting the condensation of a phenol to a polyphenylene oxide.

Any combination of Type (A) and Type (B) chelates can be employed in the practice of this invention providing that at least one member of a Type (A) and a Type (B) chelate is contained within the reaction medium. In general, suitable reaction rates are generally obtained wherein the mole proportions of Type (A) and Type (B) are within the range of from about 1:99 to 99:1, frequently within the range of from about 1:9 to about 9:1, and often within the range of from about 1:4 to about 4:1. As will be apparent to those skilled in the art from the description of the invention as set-out herein, the determination of the particular proportions of any Type (A) and Type (B) chelate mixture -- which will provide the most economical or any other benefical reaction condition(s) in either experimental or commercial practice -- can be readily determined by those skilled in the art by means of simple experimentation.

The process of forming the self-condensation products of phenol in accordance with this invention comprises a reaction of oxygen with a phenol having the structural formula:

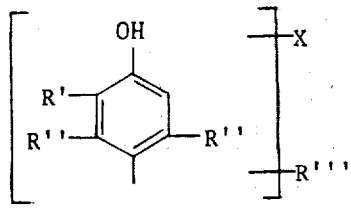

Formula (7)

where X is a substituent selected from the group consisting of hydrogen, chlorine, bromine, and iodine; R' is a monovalent constituent selected from the group consisting of hydrogen, hydrocarbon radicals, halohydrocarbon radicals having at least two carbon atoms between the halogen atoms and phenol nucleus, hydrocarbonoxy radicals, and halohydrocarbonoxy radicals having at least two carbon atoms between the halogen atoms and phenol nucleus, R'' and R''' being the same as R' and, in addition, halogen, wherein the reacting is carried out in the presence of a basic solution of a mixture of a Type (A) and a Type (B) manganese chelate in which the phenol is soluble.

Representative of phenols of Formula (7), among others, which can be employed alone or in admixture are the following: 2,6-dimethylphenol, 2,6-diethylphenol, the 2,6-dipropylphenols, the 2,6-dibutylphenols, 2,6-dilaurylphenol, 2,6-diphenylphenol, 2,6-dimethoxyphenol, 2,3,6-trimethylphenol, 2,3,5,6-tetramethylphenol, 2,6-diethoxyphenol, 2-methoxy-6-ethoxyphenol, 2-ethyl-4-stearyloxyphenol, the 2,6-di(chlorophenoxy)phenols, 2,6-dimethyl-3-chlorophenol, 2,3-dimethyl-4-chlorophenol, 2,6-dimethyl-3-chloro-5-bromophenol, 2,6-di(chloroethyl)phenol, 2-methyl-6-isobutylphenol, 2-methyl-6-phenylphenol, 2,6-dibenzylphenol, 2,6-ditolylphenol, 2,6-di(chloropropyl)-phenol, 2,6-di(2',4'-dichlorophenyl)-3-allylphenol, etc. Other specific examples of other phenols of Formula (3) are described in U.S. Pat. No. 3,306,875 and are hereby incorporated herein in their entirety by reference. An especially presently preferred phenol in the practice of this invention is 2,6-dimethylphenol (also known as 2,6-xylenol) because of its extended use in current polyphenylene oxide production.

As indicated hereinbefore, a mixture of Type (A) and Type (B) manganese chelate is employed in a phenol soluble solution during self-condensation of a phenol to form a polyphenylene oxide. Any liquid can be employed to form a solution of phenol and mixed Type (A) and Type (B) manganese chelates, including well known solvents, such as alcohols, ketones, hydrocarbons, chlorohydrocarbons, nitroaromatichydrocarbons, ethers, sulfoxides, etc., subject to the proviso that the solvents do not interfere with the catalytic activity of the mixture of the Type (A) and Type (B) manganese chelates in the preparation of the polyphenylene oxide. Since the solvent for the phenol and the mixture of Type (A) and Type (B) manganese chelates does not need to act as a solvent for the polymer, it may be desirable sometimes to use a solvent system, such as toluene, xylene, chlorobenzene, or nitrobenzene or mixtures thereof with methanol as a solvent system in order to cause the polymer to precipitate from the reaction medium while permitting lower molecular weight polymers to remain in solution until they form higher molecular weight polymers. The relative proportions of phenol to solvent can vary widely. Generally, presently acceptable economic reaction parameters comprise a mole proportion of phenol:solvent within the range of from about 30:70 to about 5:95. Presently preferred phenol:solvent mole proportions are within the range of from about 15:85 to about 10:90.

In order to carry out the mixed Type (A) and Type (B) manganese chelate promoted self-condensation of phenol to polyphenylene oxide the self-condensation reaction must be carried out in a basic reaction medium, such as that provided by the presence of a strong alkali metal base, e.g. alkali metal hydroxides, alkali metal alkoxides, etc., or mixtures thereof. Commercially available alkali metal bases which are readily attainable are presently preferred, such as sodium hydroxide, potassium hydroxide, lithium hydroxide, sodium methoxide, etc. Currently, it is preferred that anhydrous sodium hydroxide be employed to provide the strong basic reaction environment essential to the polymerization reaction, however, aqueous solutions, e.g. 50 percent, sodium hydroxide can be employed for convenience. The quantity of alkali metal base which is essential to the promotion of the selfcondensation reaction can readily be determined without undue experimentation by those skilled in the art. In general, however, suitable phenol:alkali metal base mole ratios are within the range of from about 1:1 to 100:1, preferably from about 40:1 to about 5:1, and even more preferably from about 20:1 to about 10:1. In the preparation of polyphenylene oxide from 2,6-xylenol, optimum overall process reaction conditions, generally, establish the desirability of employing a 2,6-xylenol:alkali metal hydroxide mole ratio within the range of from about 14:1 to about 18:1.

In general, the mole proportions of phenol:Type (A) and Type (B) chelate can vary widely to provide any desired -- including minimum, maximum or optimum -- degree of promotion of the reaction rate of phenols to polyphenylene oxide. Although not wishing to limit this invention by any theory, it is believed, in general, that both Type (A) and Type (B) manganese chelates function at temperatures of 60° C. and below as true catalysts and remain essentially unconsumed or unchanged, e.g. manganese compounds which are neither hydrolyzed nor dissociated due to thermal or other effects into noncatalytic forms during the self-condensation process.

It has been found that a mixture of the Type (A) and Type (B) manganese chelate catalyst can be employed in very small amounts relative to the amount of phenol reactant while maintaining and often improving the rate of formation of a polyphenylene oxide compared to the rates of polyphenylene oxide formation associated with prior art processes. In general, however, subject to variations in accordance with the type of Type (A) and Type (B) ligand forming molecules associated with the mixture of the Type (A) and Type (B) manganese chelates, reaction rates comparable to those of the prior art can be obtained wherein the mole ratio of phenol to a mixture of the Type (A) and Type (B) manganese chelate is within the range of from as low as about 50:1 to as high as about 500:1, or even as high as about 1000:1 wherein the reactions are carried out under (a) superatmospheric, or (b) in the presence of certain primary amines, or even as high as about 6000:1 wherein the reactions are carried out under both (a) superatmospheric pressure, and (b) in the presence of certain primary amines.

In general, it is preferred that minimum quantities of a mixture of the Type (A) and Type (B) manganese chelates be employed in order to avoid the sometimes necessary separation and/or recovery of catalyst residue from the polyphenylene oxide reaction products. Accordingly, it is preferred that the initial reaction media mole ratio of phenol:manganese Type (A) and Type (B) chelates by at least about 300:1, more preferably at least 500:1, and even more preferably at least 3000:1, wherein this process is carried out at (a) atmospheric or subatmospheric pressures, and (b) in the absence of certain primary amines.

Both in the specification and the appended claims, unless otherwise specified, wherein phenol:manganese Type (A) and Type (B) chelate numerical ratios are described, it is to be understood that the numerical proportions describe the number of moles of phenol relative to the total number of Mn atoms of the mixed manganese Type (A) and Type (B) chelates independent of the chelate form, i.e. mono-bidentate, bisbidentate, etc.

In general, the reaction temperature employed in the preparation of polyphenylene oxide in the presence of mixed Type (A) and Type (B) manganese chelates can be varied widely. Suitable polymerization temperatures, generally, fall within the range of from about 0° to about 60° C., preferably within the range of from about 10° to about 50° C., and more preferably within the range of from about 20° to 40° C. since generally optimum self-condensation reaction rates have been found to exist within the 20° to 40° C. temperature range. Because the self-condensation reactions are exothermic in nature and the Type (A) and Type (B) manganese chelates are susceptible to thermal deactivation when maintained at elevated temperatues, e.g. above 60° C. for extended periods of time, it is generally desirable to program the addition of the phenolic monomeric reactant, and in some instances the Type (A) and Type (B) manganese chelates during their initial contact within the reaction media. This programmed addition permits a suitable reaction temperature profile to be obtained whereby the reaction is maintained within a temperature range suited to optimum catalyst efficiency and optimum yields of polyphenylene oxide resin. In general, more latitude with regard to the upper limits of the reaction temperature range can be obtained wherein the process is carried out at superatmospheric oxygen pressures, e.g., 1 to 40 psig, 1 to 1000 psig, or even higher pressures. In the event that the selfcondensation reaction is discontinued or interrupted due to deactivation of Type (A) and Type (B) manganese chelates at elevated temperatures, the reaction can be resumed in a normal fashion by reducing the temperatures of reaction medium and adding thereto additional Type (A) and Type (B) manganese chelates in the amounts required to initiate and maintain the desired catalyst efficiency.

Although certain primary, secondary or tertiary amines, such as those disclosed in U.S. Pat. Nos. 3,306,874, 3,306,875, 3,384,619, 3,639,656 and 3,646,699, etc., have been taught by the prior art as being essential to the catalytic oxidative coupling of phenols carried out in the presence of certain copper-amine complexes in the preparation of polyphenylene oxide, it is unessential that any amine be employed in combination with a Type (A) and Type (B) chelate catalyst in the preparation of polyphenylene oxide in accordance with the process of this invention.

Since it is believed that the use of a primary amine in combination with a Type (A) and Type (B) chelate catalyst mixture will enhance substantially the rate of selfcondensation of phenol in comparison to reaction rates associated with the use of a Type (A) and Type (B) chelate catalyst in the absence of a primary amine, it is suggested that Type (A) and Type (B) chelate-amine combinations be used in the practice of this invention. This use is suggested since it is believed that the amount of mixed Type (A) and Type (B) chelate catalyst employed can be substantially reduced - thereby increasing the phenol to mixed Type (A) and Type (B) manganese chelate ratio - while still maintaining a polyphenylene oxide reaction rate comparable to that found in the absence of a primary amine.

The primary amine classes which can be employed include any primary mono- or polyamine of the following formula:

$$\text{Formula (8)} \quad R^1 + NH_2)_y ,$$

wherein $R^1$ is selected from mono- or polyvalent aliphatic and aromatic radicals, or combinations thereof, $y$ is a positive integer equal to at least 1, subject to the proviso that (a) at least three carbon atoms separate any amino ($-NH_2$) group from any other amino ($-NH_2$) group, and (b) at least two carbon atoms separate any amino group ($-NH_2$) from any other nucleophile. As used herein and in the appended claims, the term "any other nucleophile" is intended to describe and include any electron-releasing group selected from the group consisting of monoalkylamino, $-NHR^2$; dialkylamino, $-N(R^2)_2$; hydroxy, $-OH$; alkoxy, $-OR^2$; or alkanoate, $-OOCR^2$ group; $R^2$ in all instances being an alkyl group. More specific descriptions, including examples of individual mono- and polyamines, of Formula (8) follow:
  methylamine,
  ethylamine,
  2-hydroxyethylamine,
  2-methylaminoethylamine,
  n-propylamine,
  isopropylamine,
  cyclobutylamine,
  tertiary-butylamine,
  cyclobutylamine,
  1,4-butanediamine,
  4-hydroxybutylamine,
  4-ethoxybutylamine,
  n-pentylamine,
  1,5-pentanediamine,
  cyclopentylamine,
  n-hexylamine,
  4-isopropylcyclohexylamine,
  bis(3-aminopropyl)sulfide,
  1,4-cyclohexanediamine,
  N-methyl-bis(3-aminopropyl)amine,
  3-methoxyhexamethylenediamine,
  benzylamine,
  1,6-hexanediamine,
  1,3-xylenediamine - also known as 1,3-bis(aminomethyl)benzene,
  1,3-bis(aminomethyl)cyclohexane,
  1,2-bis(3-aminopropoxy)ethane,
  3-methylheptamethylenediamine,
  1,8-octanediamine,
  4-isopropyl-1,3-phenylenediamine,
  bis(4,4'-aminocyclohexyl)methane,
  1,5-diaminonaphthalene,
  bis(3,3'-aminophenyl)methane,
  bis(4,4'-aminophenyl)methane,
  5-hydroxynonamethylenediamine,
  4,4'-diaminodiphenylsulfide,
  4,4'-diaminodiphenylsulfone,
  4,4'-diaminodiphenylether,
  3,3'-dimethylbenzidine,
  3,3'-dimethoxybenzidine,
  4,4'-diaminodiphenylmethane,
  bis(p-β-amino-t-butylphenyl)ether,
  n-eicosylamine,
  1,20-eicosanediamine,
  1,30-tricontanediamine, etc.

Preferably, the primary amines are mono- or polyamino substituted aliphatic or aromatic molecules having other than hydrogen, only amino (-$NH_2$) nucleophilic substituents attached to carbon atoms. Particularly preferred amines are polyamino (-$NH_2$) substituted mono- and polycyclic aromatic compounds wherein the amino groups are bonded directly to either an aromatic ring carbon atom or to an aliphatic group that is bonded to an aromatic ring carbon atom. Presently preferred, Type AA, and more preferred, Type BB, polyamino (-$NH_2$) substituted mono- and polycyclic aromatic compounds can be represented by the following formulas:

| Formula | | Type AA | Type BB |
|---|---|---|---|
| (9a) | benzene ring with $(Z)_p$ substituent | p is ≥ 2 | p is 2 |
| (9b) | S-containing 6-ring with $(Z)_p$ | p is ≥ 2 | p is 2 |
| (10a) | biphenyl with $(Z)_p$ on each ring | p is ≥ 1 | p is 1 |
| (10b) | two S-containing rings with $(Z)_p$ on each | p is ≥ 1 | p is 1 |
| (11a) | naphthalene with $(Z)_p$ on each ring | p is ≥ 1 | p is 1 |

| Formula | Type AA | Type BB |
|---|---|---|
| (11b) 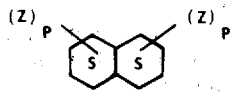 | p is ≥ 1 | p is 1 |
| (12a) 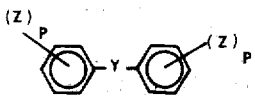 | Y in (12a) and (12b) is $C_{1-6}$ alkylene, $-O-$, $-S-$, | Y in (12a) and (12b) is the same as in Formula |
| (12b) 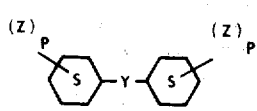 | $-SO_2-$, $NR^3$, wherein $R^3$ is $C_{1-4}$ alkyl radical | (12a) and (12b) Type AA | wherein Formulas (9) through (12), each Z is independently selected from $-NH_2$ and $-R^4-NH_2$ radicals, $R^4$ being a $C_{1-6}$ alkylene radical. Specific examples of polyamines of Formulas (9) to (12) compounds include, 1,3-bis(β-aminoethyl)benzene; 1,4-bis(γ-amino-n-hexyl)benzene; 3,3',5,5'-tetraaminobiphenyl; 1,8-bis(β-amino-n-butyl)naphthalene; 1,3-phenylenediamine; 1,4-phenylenediamine; 4,4'-diaminodiphenylpropane; 4,4'-diaminodiphenylmethane (also known as methylenedianiline); benzidine; 4,4'-diaminodiphenylsulfide; 3,3',5,5'-tetraaminodiphenylsulfone; 4,4'-diaminodiphenylether; 1,5-diaminonaphthalene; etc.

In general, when aliphatic mono- or polyamines are employed, I prefer that the amines be straight chain hydrocarbon groups having from about 1 to about 30 carbon atoms, and more preferably having from about 4 to about 15 carbon atoms. Wherein aromatic amines are used, I prefer that the aromatic amines have from about 7 to about 30 carbon atoms, and more preferably have from about 7 to about 15 carbon atoms.

In general, the amount of amines employed in the practice of this invention can vary widely. Presently preferred mole ratios of phenols:amines are within the range of from about 100:0.05 to about 100:1.5.

In general, it is believed that the use of aliphatic diamines can reduce polyphenylene oxide reaction time by as much as one-half of the reaction time generally found when aliphatic monoamines are employed as mixed Type (A) and Type (B) chelate rate enhancers, and that the use of aromatic diamines can further reduce the polyphenylene oxide reaction time by as much as one-half of the reaction time generally found when aliphatic diamines are used as mixed Type (A) and Type (B) chelate rate enhancers. As will be apparent to those skilled in the art, the variations in both the amounts and types of mixed Type (A) and Type (B) chelates and primary amines employed is essentially unlimited.

In order that those skilled in the art may better understand my invention, the following examples are given which are illustrative of the practice of this invention, however, these examples are not intended to limit the invention in any manner whatsoever. In all the examples, all parts are by weight unless otherwise stated and the following general procedure was employed. For purposes of brevity, only deviations from this procedure will be set out in the examples.

General Procedure

A solution of a phenol, e.g. 2,6-xylenol and a phenol solvent, e.g. toluene, is charged to a reactor. Stoichiometric amounts of manganese and ligand forming molecules sufficient to form bis-bidentate chelates of Type (A) and Type (B) manganese chelates, e.g. manganese(II) bis(salicylaldoxime) and manganese(II) bis(salicylaldehyde)ethylenediimine, respectively, are separately prepared and dissolved in a minimum amount of a manganese chelate solvent, e.g. methanol. After the Type (A) and Type (B) manganese chelate solvent solution is complete, an amount of a phenol solvent equal to the mixed Type (A) and Type (B) manganese chelate solvent is added. A stream of oxygen is introduced into the reactor at ambient temperature at a rate fast enough to provide sufficient oxygen to be in excess over that being absorbed while vigorously stirring the solution. The mixed manganese chelate catalyst-solution is then added to the phenol solvent solution; e.g. 2,6-xylenol-toluene. A 50% aqueous sodium hydroxide solution taken up in methanol is added to the reactor in an amount sufficient to provide a 16:1 phenol to hydroxyl ($OH^-$) mole ratio during the preparation of the polyphenylene oxide.

After initiation of the polymerization reaction, the reaction is regulated so that the reaction medium temperature does not exceed substantially 45° C., preferably 35° C. When the polyphenylene oxide intrinsic viscosity reaches the desired value as measured in chloroform at 25° C., the reaction is stopped by adding to the reactor sufficient aqueous acetic or sulfuric acid to neutralize the reaction media. After neutralization, the entire reaction mixture is precipitated with a suitable solvent, e.g. methanol. The viscosity of the polyphenylene oxide during the polymerization reaction at various timed intervals is monitored by correlation of the increase in efflux time of the polymer with a corresponding increase in efflux time of a standard volume of polymer solution in a calibrated pipette.

In the Examples, a phenyleneoxide polymer which is derived from the polymerization of 2,6-xylenol, under controlled reaction conditions, which has an intrinsic viscosity equal to or less than about 0.3 dl/g. when measured in chloroform at 25° C., is a low molecular weight polyphenylene oxide.

EXAMPLE I

A series of polyphenylene oxide reactions were conducted in accordance with the General Procedure referenced above. The 2,6-xylenol:toluene:methanol reaction parameters were 10%, 81%, and 9% by weight, respectively. The mole ratio of 2,6-xylenol to Type (A) and Type (B) manganese chelate combinations was held constant at 100:1. Similar reactions were carried out for comparative control purposes employing various combinations of Type (A) and Type (B) manganese chelates components as well as Type (A) or Type (B) manganese chelates solely. All of the polymerization reactions were carried out at atmospheric pressure.

Set out hereafter in Table I is a summary of the reaction conditions and reaction results associated with Mn(II) bis(salicylaldoxime) and bis(salicylaldehyde)ethylenediimine Type (A) and Type (B) chelate mixtures, respectively, as well as the individual Type (A) or Type (B) catalysts when employed in a polyphenylene oxide polymerization process.

ens the time period which is associated with the use of either a Type (A) or a Type (B) chelate solely.

EXAMPLE II

A series of polyphenylene oxide reactions were conducted in accordance with the General Procedure referenced hereinbefore except that the reaction was run at 35° C. under 40 psig oxygen pressure. 2,6-xylenol:-toluene:methanol reaction parameters were 15%, 76% and 9% by weight, respectively. The mole ratio of 2,6-xylenol to Type (A), manganese(II) bis(salicylaldoxime), and Type (B), manganese(II) bis(salicylaldehyde)ethylenediimine, chelate combinations were held constant at 400:1. After the polymerization reaction had proceeded for 60 minutes, polyphenylene oxide polymers having the intrinsic viscosities set out in Table II were obtained. The results of varying the mole proportions of the Type (A) and Type (B) in the chelate mixtures are illustrated by the data in Table II which follows. Control data for each of the catalyst component Types (A) and (B) employed alone in reactions similar to those employing mixed Type (A) and Type (B) chelates are also set out in Table II.

TABLE II

| Run No. | Mole Ratio Xylenol: Mn(II) (A)+(B) | Mole % Mn(II) (A):(B) | Σ Time (T) | I.V. [n] | Calc. I.V. Additive Effect [n'] | Calc. % Increase in I.V. [n']/[n]×100 | Calc. Ratio [n]/[n'] |
|---|---|---|---|---|---|---|---|
| 1. | 375:1 | 100:0 | 60 | 50 | n.a. | n.a. | n.a. |
| 2. | 400:1 | 80:20 | 60 | 53 | 46 | 115 | 1.15 |
| 3. | 400:1 | 50:50 | 60 | 56 | 40 | 140 | 1.40 |
| 4. | 400:1 | 35:65 | 60 | 48 | 37 | 130 | 1.30 |
| 5. | 400:1 | 20:80 | 60 | 32 | 34 | none | 1.0 |
| 6. | 300:1 | 0:100 | 60 | 29 | n.a. | n.a. | n.a. |

Note:
n.a. = nonapplicable
(A) = Type (A) chelate = bis(salicylaldoxime)
(B) = Type (B) chelate = bis(salicylaldehyde)-ethylenediimine The foregoing results illustrate that elevated pressure further improves the rate of formation of polyphenylene oxide when Type (A) and Type (B) chelate mixtures are employed as catalyst systems. It is also apparent from the data that the use of pressure decreases the amount of catalyst relative to phenol which is required for the preparation of polyphenylene oxide.

EXAMPLE III

A series of polyphenylene oxide reactions were conducted in accordance with the General Procedure and under the controlled reaction conditions referenced

TABLE I

| Run No. | Mole Ratio Xylenol: Mn(II) (A)+(B) | Mole % Mn(II) (A):(B) | I.V. [n] | Σ Time (T) | Calc. Time Additive Effect (T') | Calc.% Reduction in Σ Time | Calc. Ratio T'/T |
|---|---|---|---|---|---|---|---|
| 1. | 100:1 | 100:0 | 0.55 | 110 | n.a. | n.a. | n.a. |
| 2. | 100:1 | 75:25 | 0.55 | 70 | 115 | 40 | 1.67 |
| 3. | 100:1 | 50:50 | 0.55 | 54 | 120 | 55 | 2.23 |
| 4. | 100:1 | 25:75 | 0.55 | 45 | 125 | 64 | 2.78 |
| 5. | 100:1 | 20:80 | 0.55 | 50 | 126 | 60 | 2.51 |
| 6. | 100:1 | 10:90 | <0.55 | >120 | n.a. | n.a. | n.a. |
| 7. | 100:1 | 0:100 | <0.55 | >>130 | n.a. | n.a. | n.a. |

Note:
n.a. = nonapplicable
(A) = Type (A) chelate = bis(salicylaldoxime)
(B) = Type (B) chelate = bis(salicylaldehyde)-ethylenediimine As is seen from the foregoing table, the combination of Type (A) and Type (B) chelates significantly shorthereinbefore. The results of varying the mole proportions of the Type (A) and Type (B) chelate components in the catalytic mixtures are illustrated by the data in Table III which follows. Control data for each of the component Types (A) and (B), i.e. Mn(II) bis(-salicylaldoxime) and Mn(II) bis(acetylacetonate) employed alone in reactions similar to those wherein Type (A) and Type (B) were employed are also set out in Table III.

TABLE III

| Run No. | Mole Ratio Xylenol: Mn(II) (A)+(B) | Mole % Mn(II) (A):(B) | I.V. [n] | Σ Time (T) |
|---|---|---|---|---|
| 1. | 100:1 | 0:100 | <0.30 | 120 |
| 2. | 100:1 | 100:0 | 0.55 | 113 |
| 3. | 100:1 | 70:30 | 0.55 | 93 |
| 4. | 100:1 | 50:50 | 0.55 | 90 |
| 5. | 100:1 | 30:70 | 0.55 | 85 |

Note:
(A) = Type (A) chelate = bis(salicylaldoxime)
(B) = Type (B) chelate = bis(acetylacetonate)

The foregoing illustrates that rate of formation of polyphenylene oxide is improved when Type (A) and Type (B) chelate mixtures are employed as a catalyst system. This result is even more surprising in view of the fact that when the Type (B) chelate Mn(II) bis(acetylacetonate) is employed alone essentially no polyphenylene oxide is formed.

EXAMPLE IV

A polyphenylene oxide reaction was conducted in accordance with the General Procedure referenced hereinbefore except that the reaction was run at 35°C., under 40 psig oxygen pressure and 2,6-xylenol:-toluene:methanol reaction parameters of 15%, 76% and 9% by weight, respectively. The mole ratio of 2,6-xylenol to Type (A), manganese(II) bis(salicylaldoxime) plus Type (B), manganese(II) bis(acetylacetonate) chelate combination was 300:1. As a control, a Type (A) catalyst component was employed alone in a similar reaction. The time required to form a polymer having at least a 0.55 intrinsic viscosity was noted. Set out hereafter in Table IV is a summary of the reaction conditions and the reaction results:

TABLE IV

| Run No. | Mole Ratio Xylenol: Mn(II) (A)+(B) | Mole % Mn(II) (A):(B) | I.V. [n] | Σ Time (T) |
|---|---|---|---|---|
| 1. | 300:1 | 100:0 | 0.55 | 53 |
| 2. | 300:1 | 50:50 | 0.55 | 60 |

Note:
(A) = Type (A) chelate = bis(salicylaldoxime)
(B) = Type (B) chelate = bis(acetylacetonate)

As seen from the foregoing results, the combination of the Type (A) and Type (B) manganese chelates provides an effective catalyst system for the polymerization of polyphenylene oxide at elevated temperatures under oxygen pressure. The data of Run No. 2 also illustrates that the chelate mixture is a more effective catalyst system under oxygen pressure since even though the reaction was conducted under generally more severe operating conditions -- i.e. a reaction temperature of 35°C. as opposed to 25°C., xylenol:Mn(II) (A) + (B) mole ratios of 300:1 as opposed to 100:1 ratios (note Run No. 4 of Example III) -- a polyphenylene oxide polymer having an I.V. of 0.55 was obtained in 60 minutes as opposed to 90 minutes (note Run No. 4 of Example III).

From the foregoing examples, it will be apparent that the mixtures of manganese chelates are effective oxidative coupling catalysts in the self-condensation of phenol to polyphenylene oxide.

The polyphenylene oxide resins prepared by the process of this invention are suited because of their excellent physical, mechanical, chemical and film properties in a similar manner to polyphenylene oxide resins prepared by other methods well-known to those skilled in the art - including U.S. Pat. No. 3,306,875 - to a wide and varied variety of uses. For example, they can be used in molding powder formulations where they can be molded, calendered, or extruded as films, coatings, threads, filaments, tapes and the like. The polymers may also be combined with various fillers, modifying agents, etc., such as dies, pigments, stabilizers, plasticizers, etc.

Other modifications and variations of the present invention are possible in light of the above teachings. It is, therefore, to be understood that changes may be made in the particular embodiments of the invention described which are within the full intended scope of the invention as defined by the appended claims.

What I claim as new and desire to secure by Letters Patent in the United States is:

1. A process of forming self-condensation products of a phenol having the structural formula:

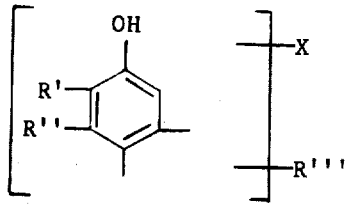

where X is a substituent selected from the group consisting of hydrogen, chlorine, bromine, and iodine; R' is a monovalent constituent selected from the group consisting of hydrogen, hydrocarbon radicals, halohydrocarbon radicals having at least two carbon atoms between the halogen atoms and phenol nucleus, hydrocarbonoxy radicals, and halohydrocarbonoxy radicals having at least two carbon atoms between the halogen atoms and phenol nucleus, R" and R'" being the same as R' and, in addition, halogen under reaction conditions which comprise contacting said phenol with oxygen in the presence of a basic reaction medium and a mixture of Type (A) and Type (B) manganese chelate complexes selected from Type (A) complexes of the formulas:

Type (A): $(L^1)_x Mn$, where $L^1$ is a ligand derived from an ortho-hydroxyareneoxime of the general formula

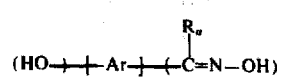

wherein $R_a$ is independently selected from the group consisting of hydrogen and lower alkyl radicals having from 1–5 carbon atoms, Ar is at least a divalent arene radical having at least one -OH radical and at least one

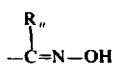

radical attached directly to ortho-positioned arene ring carbon atoms, and an ω-hydroxyoxime of the formula

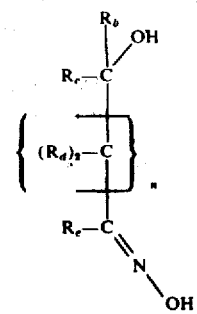

wherein each $R_b$, $R_c$, $R_d$ and $R_e$ is independently selected from the group consisting of hydrogen, acyclic and cyclic organic radicals, and $n$ is a positive integer equal to 0 or 1, Mn is the transition metal manganese(II), and $x$ is a positive number at least equal to about 0.5, and selected from Type (B) complexes of the formula:

Type (B): $(L^2)_x Mn$, wherein $L^2$ is a ligand other than an $L^1$ ligand, Mn is the transition metal manganese, and $x$ is a positive number at least equal to about 0.5.

2. A process of forming self-condensation products of a phenol having the structural formula:

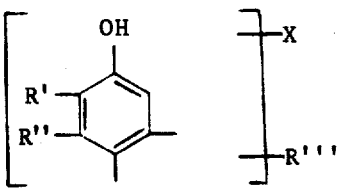

where X is a substituent selected from the group consisting of hydrogen, chlorine, bromine, and iodine; R' is a monovalent constituent selected from the group consisting of hydrogen, hydrocarbon radicals, halohydrocarbon radicals having at least two carbon atoms between the halogen atoms and phenol nucleus, hydrocarbonoxy radicals, and halohydrocarbonoxy radicals having at least two carbon atoms between the halogen atoms and phenol nucleus, R'' and R''' being the same as R' and, in addition, halogen under reaction conditions which comprise contacting said phenol with oxygen in the presence of a basic reaction medium and a mixture of Type (A) and Type (B) manganese chelate complexes selected from Type (A) complexes of the formulas:

Type (A): $(L^1)_x Mn$, where $L^1$ is a ligand derived from an ortho-hydroxyareneoxime of the general formula

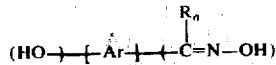

wherein $R_a$ is independently selected from the group consisting of hydrogen and lower alkyl radicals having from 1–5 carbon atoms, Ar is a mono- or dicyclic arene radical having one -OH radical and one

radical attached directly to orthopositioned arene ring carbon atoms, and an ω-hydroxyoxime of the formula

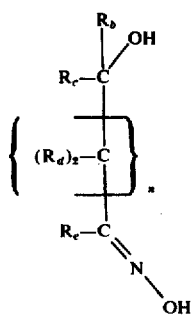

wherein each $R_b$, $R_c$, $R_d$ and $R_e$ is independently selected from the group consisting of hydrogen, acyclic and cyclic organic radicals, and $n$ is a positive integer equal to 0 or 1, Mn is the transition metal manganese(II), and $x$ is a positive number at least equal to about 1.0.

3. The process of claim 2, wherein $n$ is a positive integer equal to 1.

4. The process of claim 2, wherein $n$ is a positive integer equal to 0.

5. The process of claim 2, wherein $x$ is a positive number at least equal to about 2.

6. The process of claim 2, wherein the Ar radical contains from about 6 to about 30 carbon atoms.

7. The process of claim 1, wherein the Ar radical is selected from mono- and polycyclic radicals.

8. The process of claim 1, wherein the Ar radical is mono- or dicyclic.

9. The process of claim 6, wherein independently $R_b$, $R_c$, $R_d$, and $R_e$ is selected from hydrogen and acyclic or cyclic organic radicals containing from about 1 to about 30 carbon atoms.

10. The process of claim 9, wherein $R_b$, $R_c$, $R_d$ and $R_e$ are selected from hydrogen and acyclic or cyclic organic radicals containing from about 1 to about 15 carbon atoms.

11. The process of claim 10, wherein independently at least one of $R_b$ and $R_e$ is an aromatic radical.

12. The process of claim 2, wherein the contacting is carried out at a temperature within the range of from about 0° to about 60° C.

13. The process of claim 2, wherein the contacting is carried out at superatmospheric oxygen pressure.

14. The process of claim 2, wherein the phenol is 2,6-xylenol, the Type (A) chelate is Mn(II) bis(salicylaldoxime) and the Type (B) chelate is Mn(II) bis(salicylaldehyde)ethylenediimine.

15. The process of claim 2, wherein the phenol is 2,6-xylenol, the Type (A) chelate is Mn(II) bis(salicylaldoxime) and the Type (B) chelate is Mn(II) bis(acetylacetone).

16. The process of claim 2, wherein the contacting is carried out in the presence of a primary amine.

17. The process of claim 16, wherein the primary amine is of the formula:

$$R^1 \text{---} (NH_2)_y$$

wherein $R^1$ is selected from mono- or polyvalent aliphatic and aromatic radicals, or combinations thereof, y is a positive integer equal to at least 1, subject to the proviso that (a) at least three carbon atoms separate any amino ($-NH_2$) group from any other amino ($-NH_2$) group, and (b) at least two carbon atoms separate any amino group ($-NH_2$) from any other nucleophile.

18. The process of claim 17, wherein the amine is an aromatic amine containing from about 7 to about 30 carbon atoms.

19. The process of claim 17, wherein the amine is an aliphatic amine containing from about 1 to about 30 carbon atoms.

20. The process of claim 16, wherein the mole ratio of phenol to amine is within the range of from about 100:0.05 to about 100:1.5.

* * * * *